(12) United States Patent
Katou

(10) Patent No.: US 7,626,740 B2
(45) Date of Patent: Dec. 1, 2009

(54) IMAGE PROCESSING DEVICE, RECORDING MEDIUM AND IMAGE PROCESSING METHOD

(75) Inventor: Yousuke Katou, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 981 days.

(21) Appl. No.: 10/951,601

(22) Filed: Sep. 29, 2004

(65) Prior Publication Data
US 2005/0068555 A1 Mar. 31, 2005

(30) Foreign Application Priority Data
Sep. 30, 2003 (JP) .............................. 2003-341340

(51) Int. Cl.
H04N 1/46 (2006.01)
G03F 3/08 (2006.01)
G06F 15/00 (2006.01)

(52) U.S. Cl. ........................ 358/516; 358/518; 358/523; 358/1.9

(58) Field of Classification Search ................. 358/516, 358/518, 523, 1.9
See application file for complete search history.

(56) References Cited

U.S. PATENT DOCUMENTS

| 5,659,357 | A * | 8/1997 | Miyano .................... 348/223.1 |
| 7,098,944 | B1 * | 8/2006 | Shiraiwa et al. .......... 348/222.1 |
| 2003/0108337 | A1 * | 6/2003 | Tsuchida et al. ............... 386/95 |
| 2003/0179398 | A1 * | 9/2003 | Takano et al. ................. 358/1.9 |
| 2004/0201683 | A1 * | 10/2004 | Murashita et al. ......... 348/207.1 |
| 2004/0201766 | A1 * | 10/2004 | Funston et al. .......... 348/333.02 |

FOREIGN PATENT DOCUMENTS

| JP | 2000-78607 A | 3/2000 |
| JP | 2000-224608 A | 8/2000 |
| JP | 2002-218495 A | 8/2002 |
| JP | 2002-315019 A | 10/2002 |
| JP | 2003-244467 A | 8/2003 |

* cited by examiner

Primary Examiner—Houshang Safaipour
(74) Attorney, Agent, or Firm—Sughrue Mion, PLLC

(57) ABSTRACT

Color reproduction ranges for images of subjects taken in the light of plural light sources each having plural color temperatures are previously stored. First, a predetermined chromatic characteristic of an input image is analyzed, thereby determining whether the image needs white balance correction or not. If the image is determined to need white balance correction, a color reproduction range close to the color distribution of the image is selected from among the color reproduction ranges previously stored, and white balance correction adapted for a color temperature associated with the color reproduction range is performed.

14 Claims, 10 Drawing Sheets

IMAGE PROCESSING DEVICE, RECORDING MEDIUM AND IMAGE PROCESSING METHOD

BACKGROUND OF THE INVENTION

1. Field of the Invention

The present invention relates to an image processing device and an image processing method that perform white balance correction for adjusting the tint of an image, and a recording medium that stores an image processing program that perform white balance correction for adjusting the tint of an image.

2. Description of the Related Art

The colors of a photographed image taken with a digital camera or the like are affected by the color of light illuminating the subject, such as white light, setting sun's light, and candlelight. For example, if a subject is photographed in the light of a tungsten lamp, the resulting photographed image tends to be generally strongly red-tinged. On the other hand, a human eye can adjust the sensitivity level of the visual cells to reduce the color change of the subject to a minimum when the light source is changed. Thus, even in the light of a tungsten lamp emitting red-tinged light, the sensitivity of the cells sensitive to red light can be reduced to provide a view similar to that in the normal white light. Therefore, depending on the light source illuminating the subject, the photographed image may appear with a substantially different impression than the photographer got when he/she took the image.

In order to bring the colors of the image close to those the photographer thought he/she saw when took the image, white balance correction has to be carried out to adjust the colors of the image so that the white color in the image is always reproduced as white. Concerning the white balance correction, in patent reference 1, there is described a method of estimating the color temperature of a light source illuminating a subject based on the chromaticity of an image and performing a color adjustment process based on the estimated color temperature of the light source.

However, the chromaticity value of blue lies in a range that is determined to have high temperature. Therefore, according to the method described in the patent reference 1, the white balance correction is performed on not only the images of subjects illuminated by blue-tinged light having a high color temperature but also the images of blue subjects. As a result, there is a possibility that even images of a blue car, blue sky or the like, which require no correction, are disadvantageously corrected to be white-tinged.

Besides, even images of the same subject taken in the light of the same light source vary in chromaticity distribution depending on the type of the negative of the film, the exposure condition, the type of the camera or the like. Therefore, the method described in the patent reference 1 may cause variable precision of the white balance correction.

The term "photographed image" used herein refers to not only photographed images taken with digital cameras but also photographed images taken with film cameras, photographed images of motion pictures taken with video cameras and the like.

Patent reference 1: Japanese Patent Laid-Open No. 2000-78607

SUMMARY OF THE INVENTION

In view of such circumstances, the present invention provides an image processing device and an image processing method that can make precise white balance correction, and a recording medium that stores the image processing program.

In view of the above circumstances, an image processing device according to the present invention includes:

an image input section that receives an image of a subject;

a storage section that stores color reproduction ranges each corresponding to color temperature;

an analysis section that analyzes a chromatic characteristic of the image received and determines whether the image needs white balance correction or not;

a color reproduction range selecting section that analyzes a color distribution of the image and selects a color reproduction range close to the color distribution from among the color reproduction ranges stored in the storage section, when the analysis section determines that the image needs white balance correction; and a correction processing section that performs white balance correction based on the color reproduction range selected by the color reproduction range selecting section.

The image processing device according to the present invention first analyzes a chromatic characteristic of the input image to determine whether the image needs white balance correction or not. An image that needs no white balance correction, such as an image of a blue car, is exempted from white balance correction, so that potentiality for unnecessary correction can be prevented.

On the other hand, for an image that needs white balance correction, a color reproduction range suitable for the color distribution of the image is selected, and white balance correction adapted for the color temperature associated with the color reproduction range is performed, so that the precision of the white balance correction can be improved.

In addition, in the image processing device according to the present invention, the storage section preferably stores plural sets of plural color reproduction ranges, each of the color reproduction ranges being associated with one of plural color temperatures for a light source, and each of the sets being associated with one of plural different image acquisition conditions.

For example, even if the color temperature of the light source is not changed, the color reproduction range may vary due to a difference of an image acquisition condition, such as an exposure condition. Thus, the white balance correction can be made with a higher precision by previously storing plural sets of plural color reproduction ranges, each of the color reproduction ranges being associated with one of plural color temperatures for a light source, and each of the sets being associated with one of plural different image acquisition conditions.

In addition, in the image processing device according to the present invention, the analysis section preferably hierarchically analyzes plural chromatic characteristics of the image received at the image input section.

By hierarchically analyzing plural chromatic characteristics, the analysis can be performed more efficiently.

In addition, in order to attain the object described above, a recording medium according to the present invention includes a program capable of causing a computer to process steps having:

an image input step of inputting an image of a subject;

an analysis step of analyzing a predetermined chromatic characteristic of the image received at the image input section, thereby determining whether the image needs white balance correction or not;

a color reproduction range selecting step of analyzing a color distribution of the image if the analysis section determines that the image needs white balance correction and selecting a color reproduction range close to the color distribution from among previously stored color reproduction ranges for images of subjects taken in the light of plural light sources each having plural color temperatures; and a correction processing step of performing white balance correction adapted for a color temperature associated with the color reproduction range selected by the color reproduction range selecting section.

In addition, in the recording medium according to the present invention, the color reproduction range selecting section preferably selects a color reproduction range close to the color distribution from among plural sets of plural color reproduction ranges, each of the color reproduction ranges being associated with one of plural color temperatures for a light source, and each of the sets being associated with one of plural different image acquisition conditions.

Furthermore, in the recording medium according to the present invention, the analysis section preferably hierarchically analyzes plural chromatic characteristics of the image received at the image input section.

The recording medium may be a mass recording medium, such as CD-R (Compact Disk Recordable), CD-RW (Compact Disk ReWritable) and MO (Magneto-Optical disk), as well as a hard disk.

In addition, in view of the above circumstances, an image processing method according to the present invention includes:

an image input step of inputting an image of a subject;

an analysis step of analyzing a predetermined chromatic characteristic of the image received at the image input section, thereby determining whether the image needs white balance correction or not;

a color reproduction range selecting step of analyzing a color distribution of the image if the analysis section determines that the image needs white balance correction and selecting a color reproduction range close to the color distribution from among previously stored color reproduction ranges for images of subjects taken in the light of plural light sources each having plural color temperatures; and a correction processing step of performing white balance correction adapted for a color temperature associated with the color reproduction range selected by the color reproduction range selecting section.

By applying the image processing method, white balance correction can be made with a high precision.

The present invention can provide an image processing device and an image processing method that can make precise white balance correction and a recording medium that stores an image processing program that can make precise white balance correction.

DETAILED DESCRIPTION OF THE INVENTION

In the following, embodiments of the present invention will be described.

Figure 1:
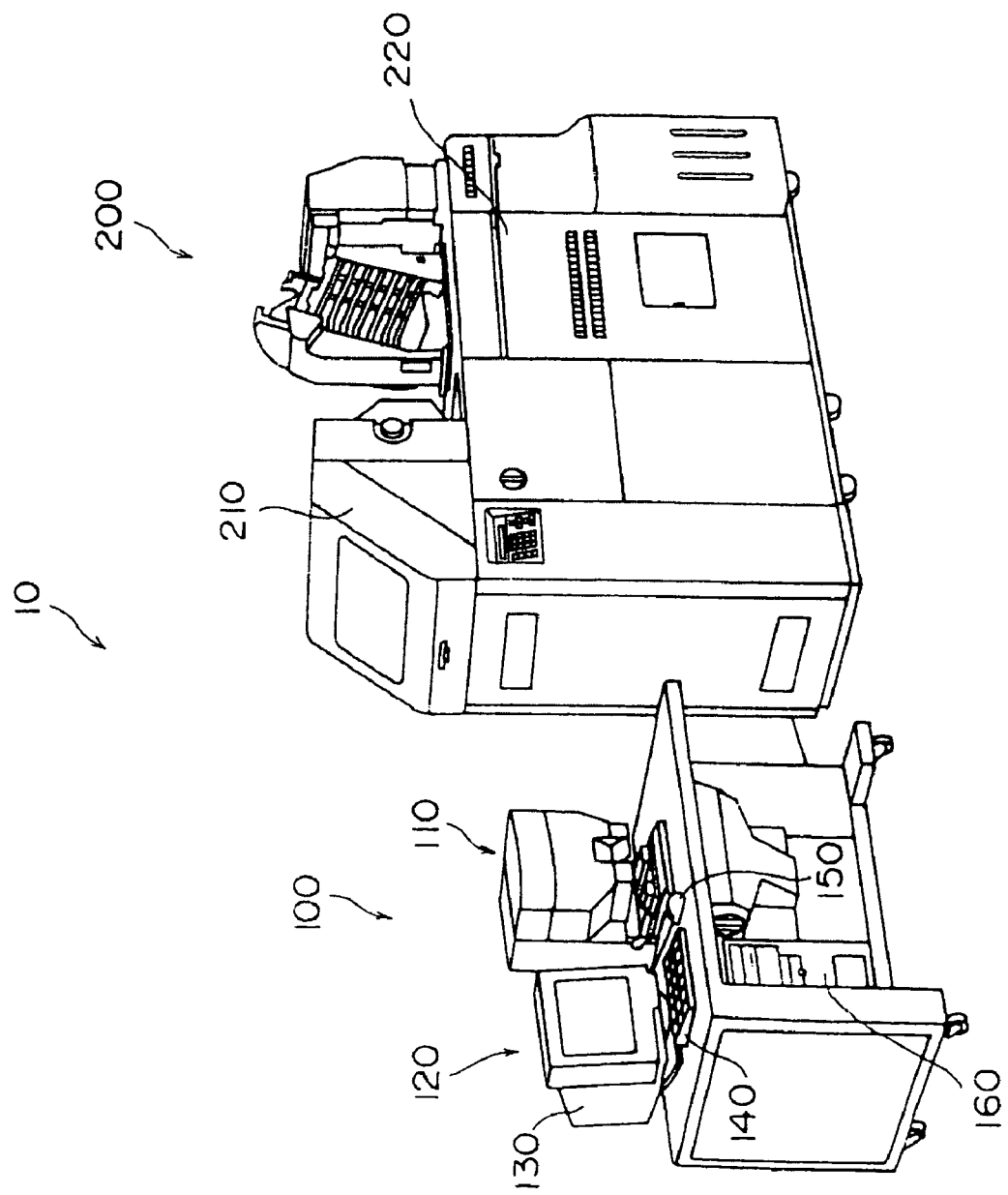
FIG. 1 is a perspective view of a photographic digital printer that incorporates an image processing device according to an embodiment of the present invention.

FIG. 1 is a perspective view of a photographic digital printer that incorporates an image processing device according to an embodiment of the present invention and produces a photographed image print based on digital image data.

A photographic digital printer 10 obtains photographed image data by optically reading a photographed image recorded on a photographic film or reading a photographed image taken with a digital camera or the like and recorded in a small recording medium, performs a predetermined correction on the photographed image data to generate corrected image data, and records the corrected image data or an image corrected based on the corrected image data in a recording medium, such as a flexible disk (referred to as an FD, hereinafter), or in a photographic print, respectively. The recording medium for storing the corrected image data or the like is not limited to the FD, and mass recording media having recently become widespread, such as CD-R, CD-RW, and MO, may be used. In this embodiment, the recording medium is an FD that can be accessed using an FD drive, which is standard equipment of common personal computers.

The photographic digital printer 10 has an image input machine 100 and an image output machine 200.

The image input machine 100 has a scanner section 110 that successively and optoelectronically reads plural photographed images recorded on a developed photographic film on a frame basis, and an image correction processing section 120 that performs a predetermined correction on the photographed image data obtained by the scanner section 110. The image correction processing section 120 has a CRT (Cathode Ray Tube) display section 130, a keyboard 140, a mouse 150, and a circuit section 160. The circuit section 160 has a small recording medium loading slot (not shown) for loading of a small recording medium, an FD loading slot (not shown) for loading of an FD, and a CD-ROM loading slot (not shown) for loading of a CD-ROM. The circuit section 160 is generally composed of a computer circuit section, which constitutes a computer system together with the CRT display section 130, the keyboard 140 and the mouse 150, and an image processing board, which is image correction processing hardware. The sections of the image input machine 100 will be described in detail later.

The image output machine 200 has a laser printer section 210 that forms an image on a sheet of photographic paper by exposing the sheet to scanning laser light modulated according to the image data obtained in the image input machine 100, and a processor section 220 that develops the sheet of photographic paper exposed by the laser printer section 210 to provide a print photograph. The inside arrangement of the image output machine 200 will be described later.

Now, an arrangement of the scanner section 110 of the image input machine 100 and a procedure of reading a photographed image recorded on a photographic film will be described.

Figure 2:
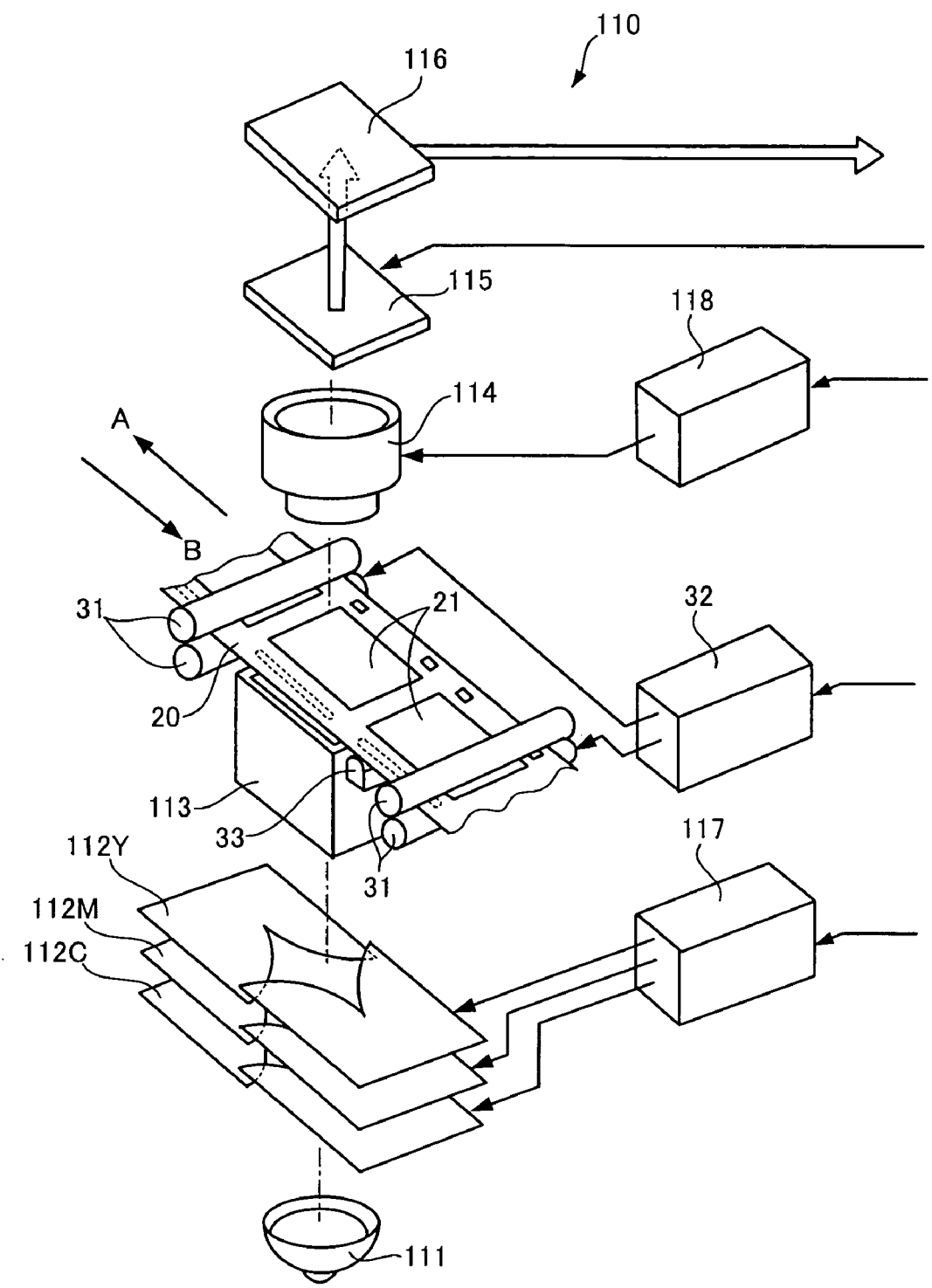
FIG. 2 schematically shows an arrangement of a scanner section of an image input machine.

FIG. 2 schematically shows an arrangement of the scanner section 110 of the image input machine 100.

Referring to this drawing, a developed photographic film 20 is set in a film carrier (not entirely shown) which has a feeding roller 31 and a feeder driving section 32, the feeding roller 31 is driven by the feeder driving section 32 to feed the photographic film 20 in the direction of the arrow A, and photographed images recorded on the photographic film 20 are read roughly and quickly on a frame basis (this process is referred to as pre-scanning, hereinafter).

The scanner section 110 has a light source 111, such as a halogen lamp and a metal halide lamp. Light emitted from the light source 111 illuminates the photographic film 20 from below as shown in FIG. 2 after passing through three filters 112C, 112M and 112Y, which allow light of cyan color (C), magenta color (M) and yellow color (Y) to pass therethrough, respectively, and through a diffusion box 113. The light having passed through the photographic film 20 passes through a zoom lens 114 and then reaches a CCD (Charge Coupled Devices) optical sensor 115. On a plane including a sensor plane of the CCD optical sensor 115, a photographed image recorded on the photographic film 20 is focused by the action of the zoom lens 114. Photographed image signals picked up by the CCD optical sensor 115 are converted into digital photographed image data by an A/D converter 116, and the digital photographed image data is transmitted to the circuit section 160 described later.

The three filters 112C, 112M and 112Y each have an opening that allows light to pass therethrough without influenced by the filter at the center thereof, and the light passing through each filter at the area surrounding the opening is influenced by the filter. A filter control section 117 adjusts the size of the opening of each filter, thereby adjusting the degree of influence of each filter. The light having passed through the three filters 112C, 112M and 112Y is diffused in the diffusion box 113 to become uniform light, which illuminates the photographic film 20.

The photographed image on the photographic film 20 is focused on the surface of the CCD optical sensor 115 by the zoom lens 114. The zoom lens 114 is driven by a zoom lens driving section 118 to adjust the focal length thereof, and the photographed image is focused on the sensor plane of the CCD optical sensor 115 under a magnification depending on the focal length of the zoom lens 114. The CCD optical sensor 115 is composed of three line sensors arranged in the feed direction of the photographic film 20, each of line sensors having multiple light-receiving elements arranged in the width direction of the photographic film 20. The line sensors have color separation filters for red (R), green (G) and blue (B), respectively, on the surfaces thereof and read the R, G and B components of the photographed image recorded on the photographic film 20, respectively. The three line sensors repeat image reading during feeding of the photographic film 20 in the A or B direction, thereby reading a two-dimensional photographed image on the photographic film 20 on a frame basis.

In pre-scanning in which the CCD optical sensor 115 reads an image on the photographic film 20 fed in the direction of the arrow A, the feed speed of the photographic film 20 is high, and the line sensors of the CCD optical sensor 115 read the image with the light-receiving elements arranged at intervals. Thus, the resulting image is coarse.

In pre-scanning, the three filters 112C, 112M and 112Y are controlled to have an opening of a predetermined size. Following the pre-scanning, the read photographed image and a previously prepared condition entry window are displayed on the CRT display section 130 shown in FIG. 1. The operator checks the photographed image and the condition entry window on the CRT display section 130 and specifies an image acquisition condition, such as print size, image density and color densities of C, M and Y. Once the image acquisition condition is specified, the three filters 112C, 112M and 112Y are adjusted to meet the specified image acquisition condition, and, as required, the focal length of the zoom lens 114 is adjusted to meet the specified print size. Then, the photographic film 20 is fed in the direction of the arrow B, and the CCD optical sensor 115 reads the photographed image by conducting a thinning process according to the specified print size (or without any thinning process) (this process is referred to as fine scanning, hereinafter). The photographed image signals provided in the CCD optical sensor 115 are converted into digital photographed image data by the A/D converter 116, and the digital photographed image data is transmitted to the circuit section 160, as described above.

Now, an arrangement of the circuit section 160 of the image correction processing section 120 of the image input machine 100 will be described.

Figure 3:
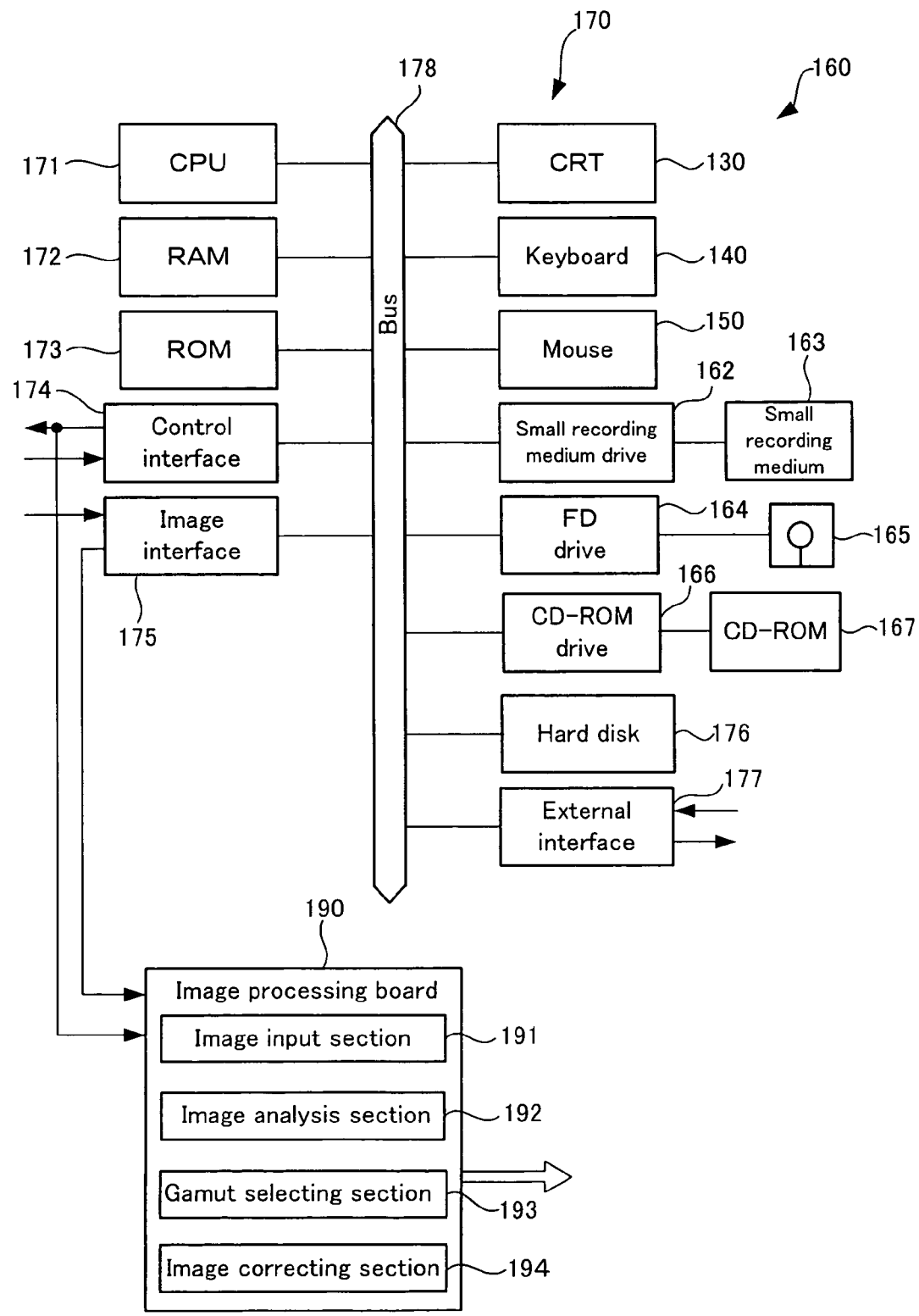
FIG. 3 is a block diagram of a circuit section of an image correction processing section of the image input machine.

FIG. 3 is a block diagram of the circuit section 160 of the image correction processing section 120 of the image input machine 100.

In general, the circuit section 160 is composed of a computer circuit section 170 and an image correction processing board 190.

The computer circuit section 170 includes: a CPU 171 that executes various programs; an RAM (Random Access Memory) 172 used as a work area for execution of the various programs by the CPU 171; an ROM 173 that stores unchangeable constants or the like; a control interface 174 for input/output of control signals for controlling the sections of the image input machine 100; an image interface 175 that receives images from the scanner section 110 shown in FIG. 2 and outputs images to the image correction processing board 190; the small recording medium drive 162 for accessing the small recording medium 163; the FD drive 164 for accessing the FD 165; the CD-ROM drive 166 for accessing the CD-ROM 167; a hard disk 176; and an external interface 177 that transmits/receives data to/from the image output machine 200 shown in FIG. 1. These components are interconnected via a bus 178 with the CRT display section 130 whose appearance is shown in FIG. 1, the keyboard 140 and the mouse 150.

In the example shown in this drawing, the control interface 174 transmits control signals to the feeder driving section 32, the filter control section 117 and the zoom lens driving section 118 in FIG. 2. In response to the control signals, the feeder driving section 32, the filter control section 117 and the zoom lens driving section 118 carry out feeding the photographic film 20, adjustment of the filters 112C, 112M and 112Y, and adjustment of the focal length of the zoom lens 114 (adjustment of the magnification of the focused image), respectively.

Besides, the control interface 174 outputs a control signal for controlling the CCD optical sensor 115 or control signals for controlling other sections of the image input machine 100.

Furthermore, the control interface 174 transmits various kinds of data, an image acquisition condition specified by the operator, or the like to the image processing board 190.

The CD-ROM 167 is a recording medium according to an embodiment of the present invention, and stores an image processing program that makes the image processing board 190 operate as an image processing device according to an embodiment of the present invention. The CD-ROM 167 is loaded to the CD-ROM drive 166, and the image processing program stored in the CD-ROM 167 is uploaded to the image processing board 190 via the control interface 174. Thus, the image processing board 190 operates as the image processing device according to the embodiment of the present invention.

Now, the image processing program executed in the image processing board 190 will be described.

Figure 4:
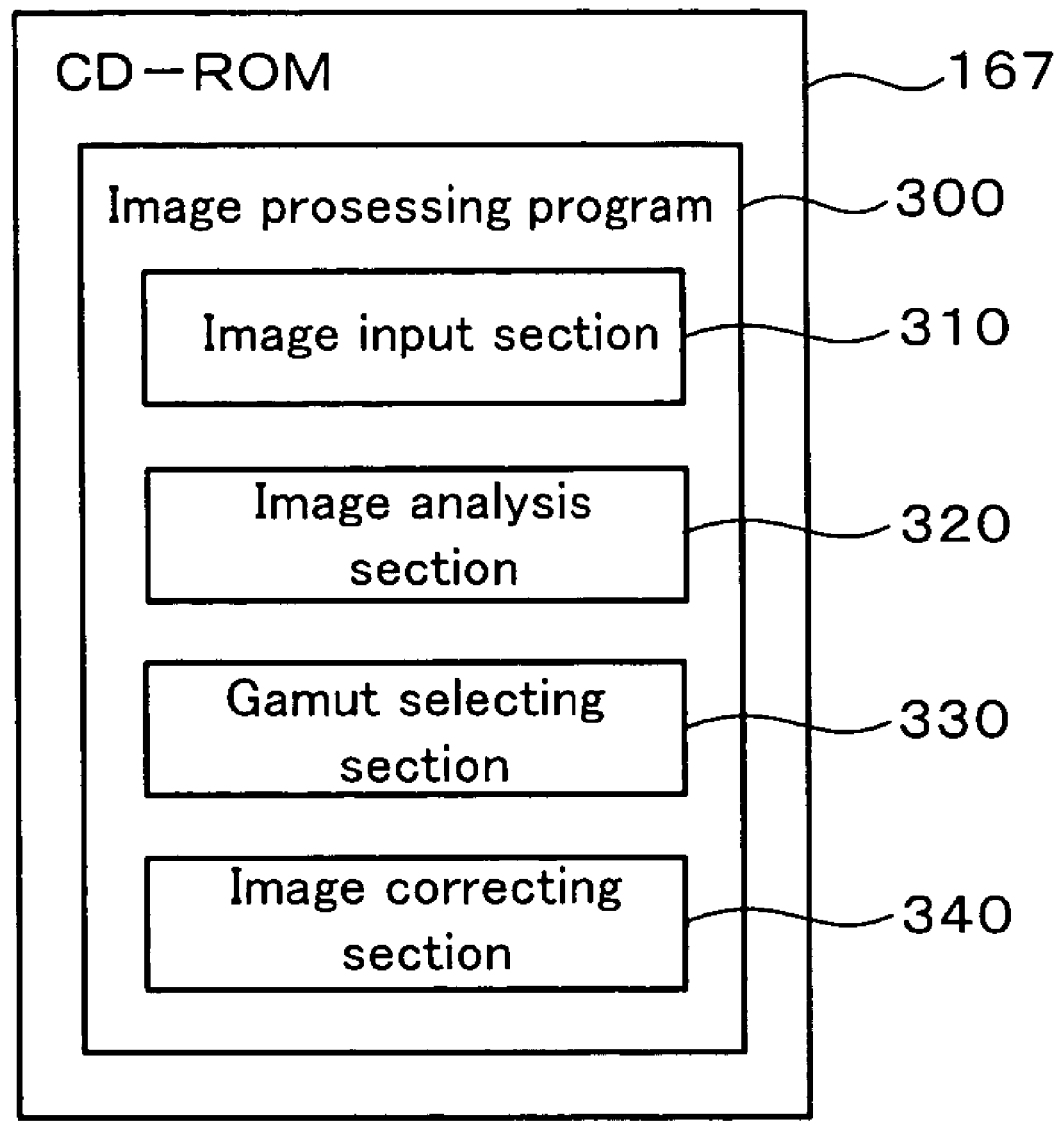
FIG. 4 is a schematic diagram of a CD-ROM (Compact Disk Read Only Memory) storing an image processing program according to an embodiment of the present invention.

FIG. 4 is a schematic diagram of the CD-ROM storing the image processing program according to the embodiment of the present invention.

An image processing program 300 has an image input section 310, an image analysis section 320, a gamut selecting section 330 and an image correcting section 340. The image input section 310 is an example of an image input section of the image processing program according to the present invention. Similarly, the image analysis section 320 is an example of an analysis section of the image processing program according to the present invention, the gamut selecting section 330 is an example of a color reproduction range selecting section of the image processing program according to the present invention, and the image correcting section 340 is an example of a correction processing section of the image processing program according to the present invention. Details of the sections of the image processing program 300 will be described in conjunction with operations of the sections of the image processing board 190, which is an embodiment of the image processing device according to the present invention shown in FIG. 3.

The image processing board 190 shown in FIG. 3 has an image input section 191, an image analysis section 192, a gamut selecting section 193 and an image correcting section 194. When the image processing program 300 shown in FIG. 4 is installed in the image processing board 190, the image input section 310 of the image processing program 300 constitutes the image input section 191 shown in FIG. 3, the image analysis section 320 constitutes the image analysis section 192, the gamut selecting section 330 constitutes the gamut selecting section 193, and the image correcting section 340 constitutes the image correcting section 194.

The image input section 191 receives photographed image data obtained by the scanner section 110 or photographed image data recorded in the small recording medium 163. The image input section 191 is an example of an image input section of the image processing device according to the present invention.

The image analysis section 192 analyzes chromatic characteristics of the photographed image represented by the photographed image data input at the image input section 191. The image analysis section 192 is an example of an analysis section of the image processing device according to the present invention.

The gamut selecting section 193 analyzes the color distribution of the photographed image and selects a color reproduction range suitable for the color distribution from among plural color reproduction ranges previously stored in the hard disk 176 (such a color reproduction range is referred to as a gamut, hereinafter). The gamut selecting section 193 is an example of a color reproduction range selecting section of the image processing device according to the present invention, and the hard disk 176 is an example of a storage section of the image processing device according to the present invention.

The image correcting section 194 performs white balance correction on the photographed image in accordance with the color temperature for the selected gamut. The image correcting section 194 is an example of a correction processing section of the image processing device according to the present invention. The corrected image is transmitted to the FD 165 or the image output machine 200 shown in FIG. 1 and recorded in a photograph. The processings performed in the image processing board 190 will be described in detail later.

Basically, the image input machine 100 is configured as described above.

In the case where the image input machine 100 shown in FIG. 1 reads the photographed image recorded on the photographic film, once the scanner section 110 performs pre-scanning, the photographed image obtained by pre-scanning is input to the computer circuit section 170 (see FIG. 3) of the circuit section 160 via the image interface 175 and displayed on the CRT display section 130. Once the operator specifies the image acquisition condition, information about the specified image acquisition condition is transmitted to the image processing board 190 (see FIG. 3). In addition, the scanner section 110 performs fine scanning, and the resulting photographed image is input to the image processing board 190, in which various correction processings are performed on the photographed image. The corrected image is transmitted to the image output machine 200 and used as signals for modulating laser light for exposure.

Instead of reading the photographed image recorded in the photographic film with the scanner section 110, in the case where the input photographed image is a one taken with a digital camera or the like and recorded in the small recording medium 163 shown in FIG. 3, the photographed image data is input to the computer circuit section 170 via the small recording medium drive 162, and the photographed image is displayed on the CRT display section 130 shown in FIG. 1. Besides, the photographed image data is also send to the image processing board 190 via the image interface 175 and as with the photographed image read from the photographic film, once the operator specifies the image acquisition condition, such as print magnification, information about the specified image acquisition condition is transmitted to the image processing board 190, and various image correction processing are performed on the photographed image. The corrected image is transmitted to the image output machine 200.

Next, an arrangement of the image output machine 200 and a procedure of producing a photographic print of a photographed image transmitted to the image output machine 200 will be described.

Figure 5:
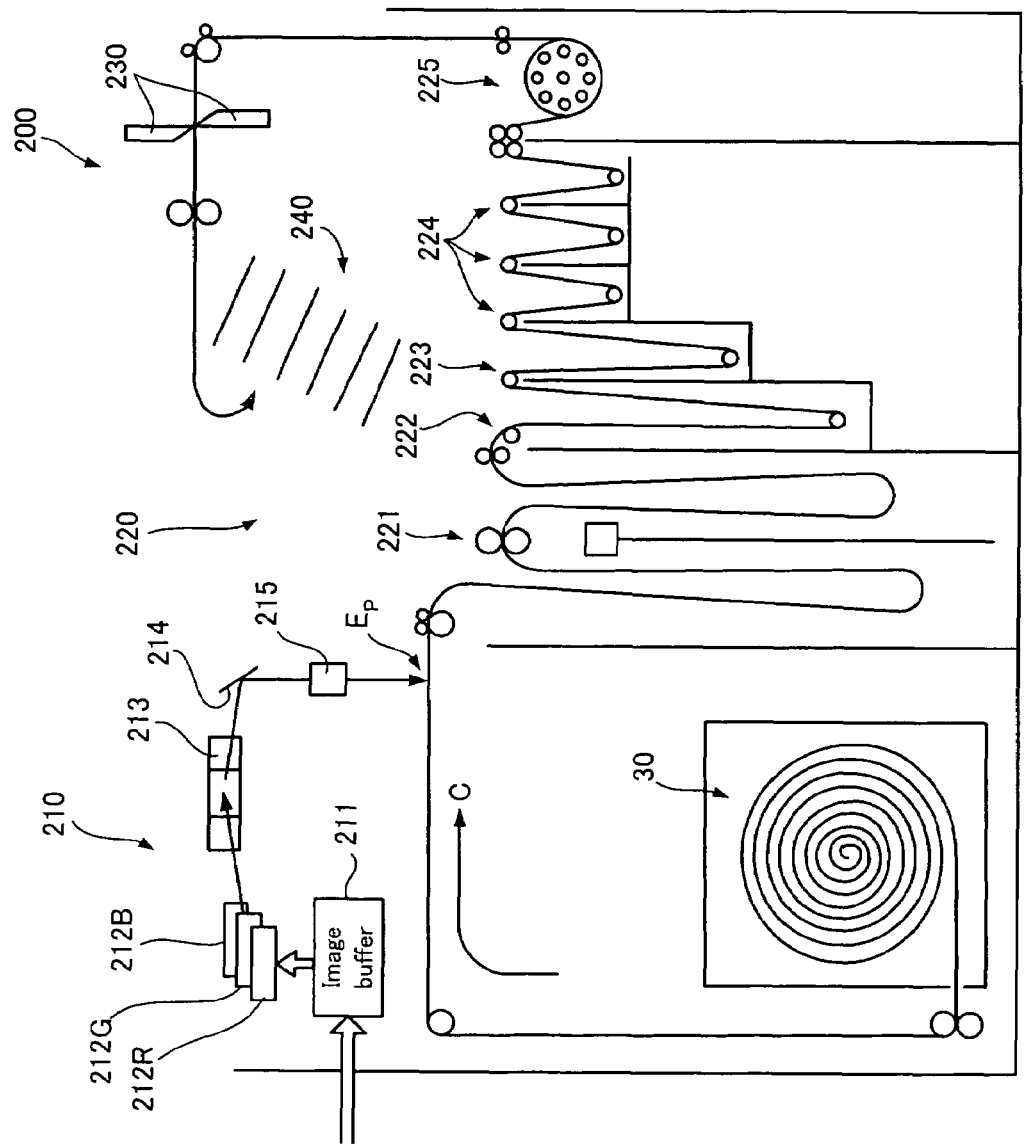
FIG. 5 schematically shows an inside arrangement of an image output machine.

FIG. 5 schematically shows an inside arrangement of the image output machine 200.

In the image output machine 200, a long roll of unexposed photographic paper 30 is loaded. The photographic paper 30 is pulled at an end thereof to pass through the laser printer section 210 and the processor section 220 and then is cut into frames by a cutter 230, and the frames of photographic paper are stacked in a sorter 240.

The images output from the image processing board 190 of the image input machine 100 and fed to the image output machine 200 are temporarily stored in an image buffer 211 of the laser printer section 210.

The laser printer section 210 has three laser light sources 212R, 212G and 212B that emit R, G and B laser light, respectively. The laser light sources 212R, 212G and 212B are driven based on R, G and B color-separated images stored in the image buffer 211, respectively, and emit laser light modulated in accordance with how they are driven. The laser light is repeatedly reflected or deflected by a rotating polygon mirror 213, reflected by a mirror 214, passes through an fθ lens 215 for adjusting the spot size on the photographic paper 30, and then scans the photographic paper 30 at an exposure section Ep in a direction perpendicular to the sheet surface of FIG. 5. During the scanning, the photographic paper 30 is fed in the direction of the arrow C, and thus, an image is formed on the photographic paper 30 by exposure.

The exposed photographic paper 30 is carried to the processor section 220, in which a reservoir section 221 first adjusts the carriage speed of the photographic paper 30. Then, the photographic paper 30 undergoes color development in a developing bath 222, bleach fixing in a fixing bath 223, rinsing in a rinsing bath 224, and drying in a drying section 225, and then is cut into photographs by the cutter 230 as described above, and the photographs are stacked in the sorter 240.

The image data obtained in the image input machine 100 is printed as a photograph in the image output machine 200 as described above.

The characteristics of the image processing device according to the present invention in the photographic digital printer 10 lie in the image processing board 190. In the following, processings performed in the image processing board 190 will be described.

Figure 6:
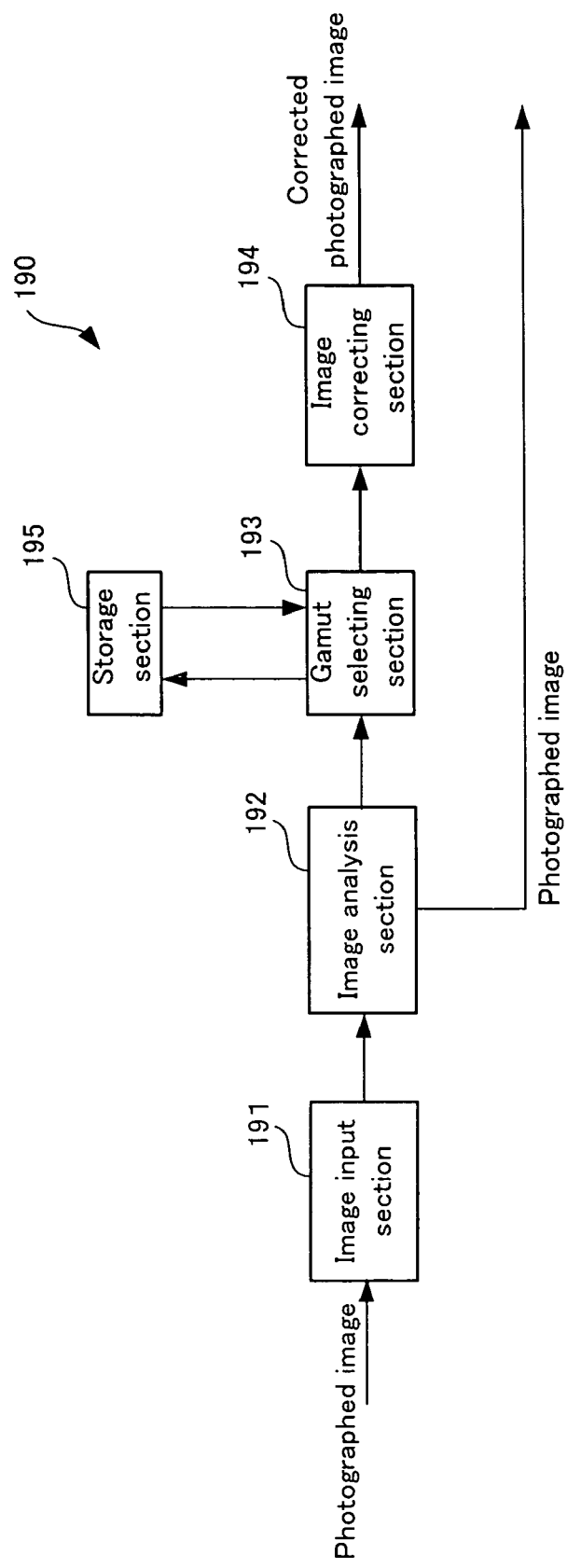
FIG. 6 is a functional block diagram of an image processing board.
Figure 7:
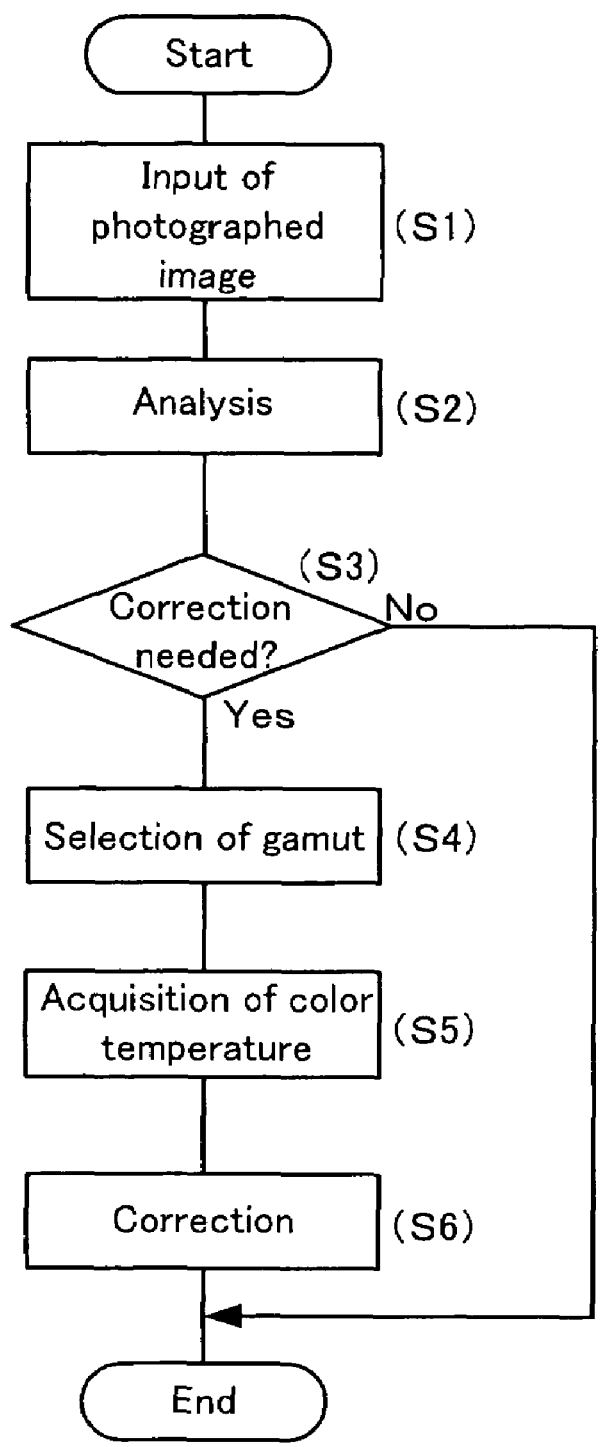
FIG. 7 is a flowchart of a series of processings performed on the image processing board shown in FIG. 6.

FIG. 6 is a functional block diagram of the image processing board 190 shown in FIG. 3, and FIG. 7 is a flowchart of a series of processings performed on the image processing board shown in FIG. 6. In the following, a series of processings performed in the image processing board 190 will be described in detail with reference to FIGS. 6 and 7.

First, the photographed image data obtained by the scanner 110 of the image input machine 100 shown in FIG. 1 or the photographed image data recorded in the small recording medium 163 shown in FIG. 3 is input to the image input section 191 shown in FIG. 6 via the image interface 175 (step S1 in FIG. 7). The processing of step S1 is an example of an image input step of the image processing method according to the present invention. The input photographed image data is fed to the image analysis section 192.

The image analysis section 192 performs hierarchical analysis of various chromatic characteristics of the photographed image represented by the photographed image data fed from the image input section 191 (step S2 in FIG. 7). The processing of step S2 is an example of an analysis step of the image processing method according to the present invention.

Figure 8:
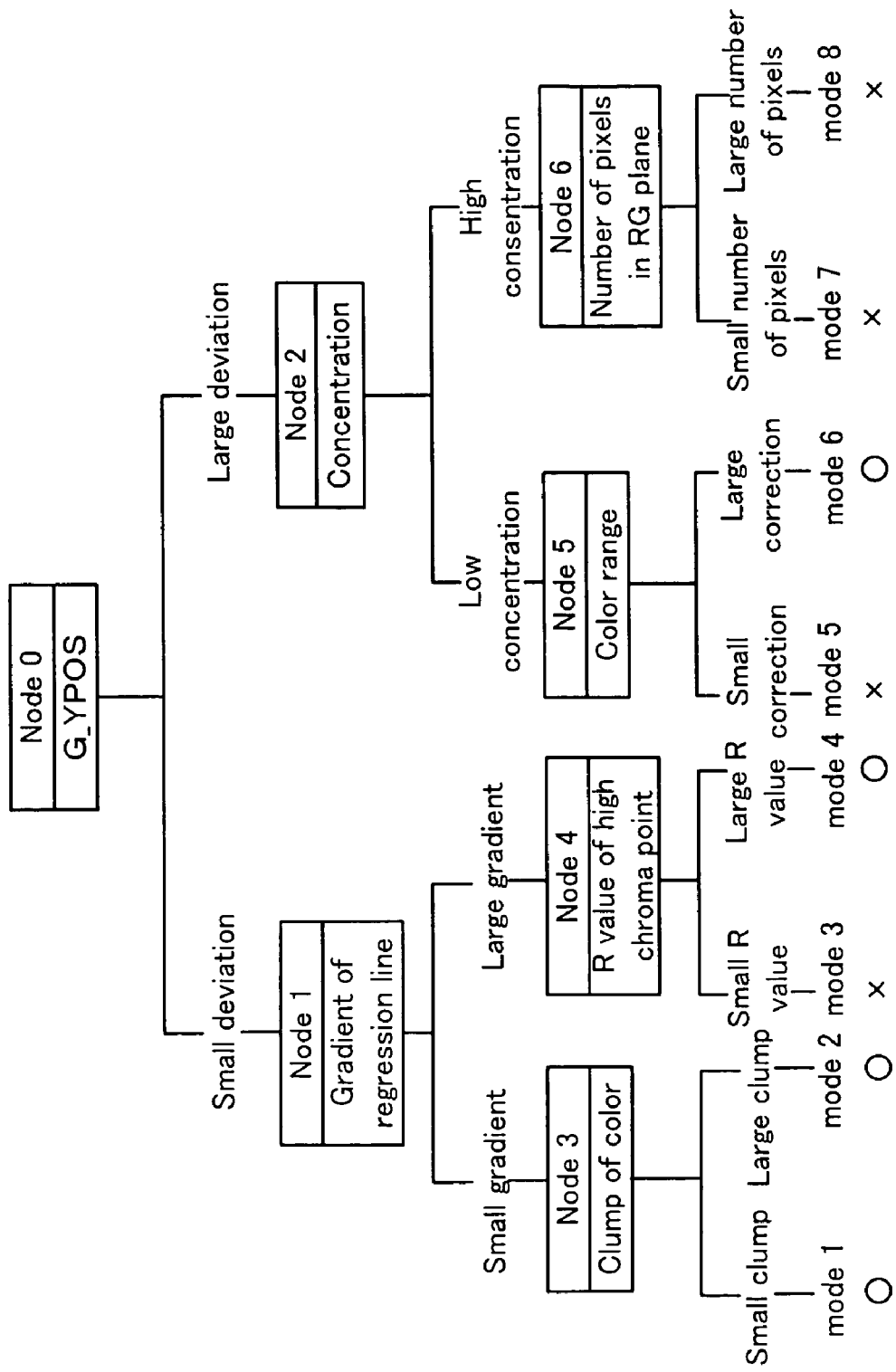
FIG. 8 shows examples of analysis items used in an image analysis section.

FIG. 8 shows examples of analysis items used in the image analysis section. These analysis items each represent a predetermined chromatic characteristic of the image. Through the hierarchical analysis of these analysis items, the photographed images are classified into images that do not need white balance correction, such as an image of a blue sky, and images that desirably undergo white balance correction, such as an image photographed in the light of a tungsten lamp, for example.

In this example, first, a deviation of the gray color in the photographed image from a target gray color previously prepared is analyzed at a node 0. If the gray color in the photographed image is close to the target gray color to a predetermined extent, the process proceeds to a node 1.

At the node 1, the gradient of a regression line resulting from normalization of the colors of the photographed image in an RB plane is analyzed. The node 1 is an item intended to analyze a bias of the whole colors of the photographed image toward red (R) or blue (B). If the gradient of the regression line is equal to or lower than a predetermined value, the process proceeds to a node 3.

At the node 3, the degree of clumping of the R color in the photographed image is analyzed. If the R color clumps to a predetermined degree, the photographed image is classified as a mode 1, and if the R color spreads out, the photographed image is classified as a mode 2.

If the gradient of the regression line is determined to be higher than the predetermined value in the analysis at the node 1 described above, the process proceeds to a node 4. At the node 4, an average R value at a high-chroma point in the photographed image is analyzed. If the R value is equal to or lower than a predetermined value, the photographed image is classified as a mode 3, and if the R value is higher than the predetermined value, the photographed image is classified as a mode 4.

Furthermore, if it is determined that the gray color in the photographed image deviates from the target gray color in the node 0 described above, the process proceeds to a node 2. At the node 2, the concentration of the gray color in the photographed image is analyzed. If the concentration of the gray color is equal to or lower than a predetermined value, the process proceeds to a node 5.

At the node 5, it is determined in which color range a color in the photographed image lies, and a target correction value previously associated with the color range is acquired. If the target correction value is equal to or lower than a predetermined value, the photographed image is classified as a mode 5, and if the target correction value is higher than the predetermined value, the photographed image is classified as a mode 6.

Besides, if it is determined that the concentration of the gray color is higher than the predetermined value in the node 2, the process proceeds to a node 6. At the node 6, the number of pixels for a color in the photographed image in a region close to the origin of the RB plane is analyzed. If the number of pixels is equal to or lower than a predetermined value, the photographed image is classified as a mode 7, and if the number of pixels is higher than the predetermined value, the photographed image is classified as a mode 8. The analysis items of the nodes 0 to 6 are examples of "plural chromatic characteristics" referred to in the present invention.

Of the photographed images classified as described above, the photographed images classified as the modes 1, 2, 4 and 6 are determined to need no white balance correction, and the photographed images classified as the modes 3, 5, 7 and 8 are determined to need white balance correction.

The photographed images can be analyzed efficiently by analyzing the colors of the photographed images using the analysis items hierarchically prepared as described above. In the analysis by the analysis section according to the present invention, for example, there may be used an analysis item for classifying a photographed image by associating the modes with an acquisition condition of the photographed image, such as an exposure condition including overexposure, normal exposure and underexposure.

The images that are determined not to need white balance correction in the image analysis section 192 shown in FIG. 6 (that is, the images of the modes 1, 2, 4 and 6) are fed to the FD 165 shown in FIG. 3 or the image output machine 200 shown in FIG. 1, rather than to the gamut selecting section 193 and the image correcting section 194 (in the flowchart in FIG. 7, the process proceeds from step S3 to the end thereof by bypassing steps S4, S5 and S6). Since white balance correction is not performed on the photographed images determined not to need white balance correction, disadvantages, such as erroneous correction, can be prevented.

Besides, the photographed images that are determined to need white balance correction in the image analysis section 192 (that is, the images of the modes 3, 5, 7 and 8) are fed to the gamut selecting section 193 (in the flowchart of FIG. 7, the process proceeds from step S3 to step S4).

The storage section 195 shown in FIG. 6 is implemented by the hard disk 176 shown in FIG. 3. The storage section 195 stores plural sets of plural gamuts (color reproduction ranges) each of which is associated with one of plural color temperatures for a light source illuminating the subject, each set being prepared for an acquisition condition of the photographed image.

Figure 9:
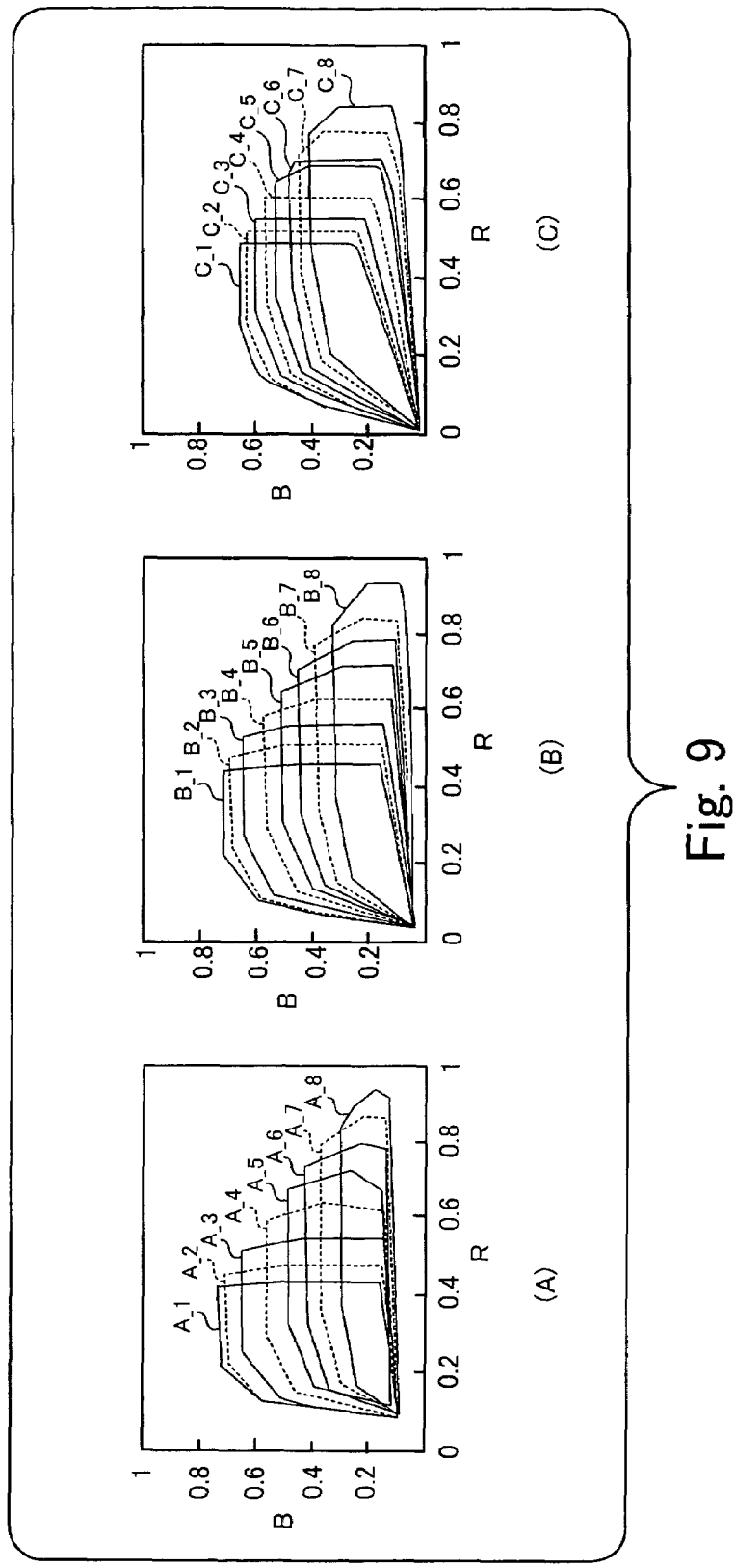
FIG. 9 shows examples of sets of gamuts stored in a storage section.

FIG. 9 shows examples of gamuts stored in the storage section.

Part (A) of FIG. 9 shows plural gamuts (A_1 to A_8) associated with plural color temperatures for the light source in the case where a photographed image is taken under an underexposure condition. In this example, a gamut A_1 is associated with a color temperature of 3000K, a gamut A_2 is associated with a color temperature of 3390K, a gamut A_3 is associated with a color temperature of 3780K, a gamut A_4 is associated with a color temperature of 4340K, a gamut A_5 is associated with a color temperature of 5270K, a gamut A_6 is associated with a color temperature of 6730K, a gamut A_7 is associated with a color temperature of 8810K, and a gamut A_8 is associated with a color temperature of 10700K. In this way, different gamuts (A_1 to A_8) correspond to different color temperatures for a light source. Part (B) of FIG. 9 shows plural gamuts (B_1 to B_8) associated with plural color temperatures for the light source in the case of a normal exposure condition. In the case of the normal exposure condition, the gamuts are slightly wider than in the case of the underexposure condition. Part (C) of FIG. 9 shows plural gamuts (C_1 to C_8) associated with plural color temperatures for the light source in the case of an overexposure condition. In the case of the overexposure condition, differences among the gamuts for the color temperatures are generally reduced. In this way, even if the color temperature of the light source is not changed, the gamut may vary with an acquisition condition of the image, such as an exposure condition. The various gamuts shown in FIG. 9 are examples of a "color reproduction range" referred to in the present invention, and the sets of gamuts shown in parts (A), (B) and (C) are examples of a "set" referred to in the present invention.

In this example, Kelvin (K) is used as the unit of the color temperature. However, other units, such as mired, may be used. Furthermore, the image acquisition condition for classifying gamut sets may be the type of negatives varying with manufacturers, the type of films of a manufacturer, or models of a digital camera or a film camera.

The gamut selecting section 193 shown in FIG. 6 selects a gamut suitable for the photographed image fed from the image analysis section 192 from among the various gamuts stored in the storage section 195 shown in FIG. 9 (step S4 in FIG. 7). The processing of step S4 is an example of a color reproduction range selecting step of the image processing method according to the present invention. When selecting a gamut suitable for the photographed image, the chromaticity distribution of the photographed image is analyzed first. The analysis of chromaticity distribution is a conventional and popular procedure, and thus, is not described in this specification.

Figure 10:
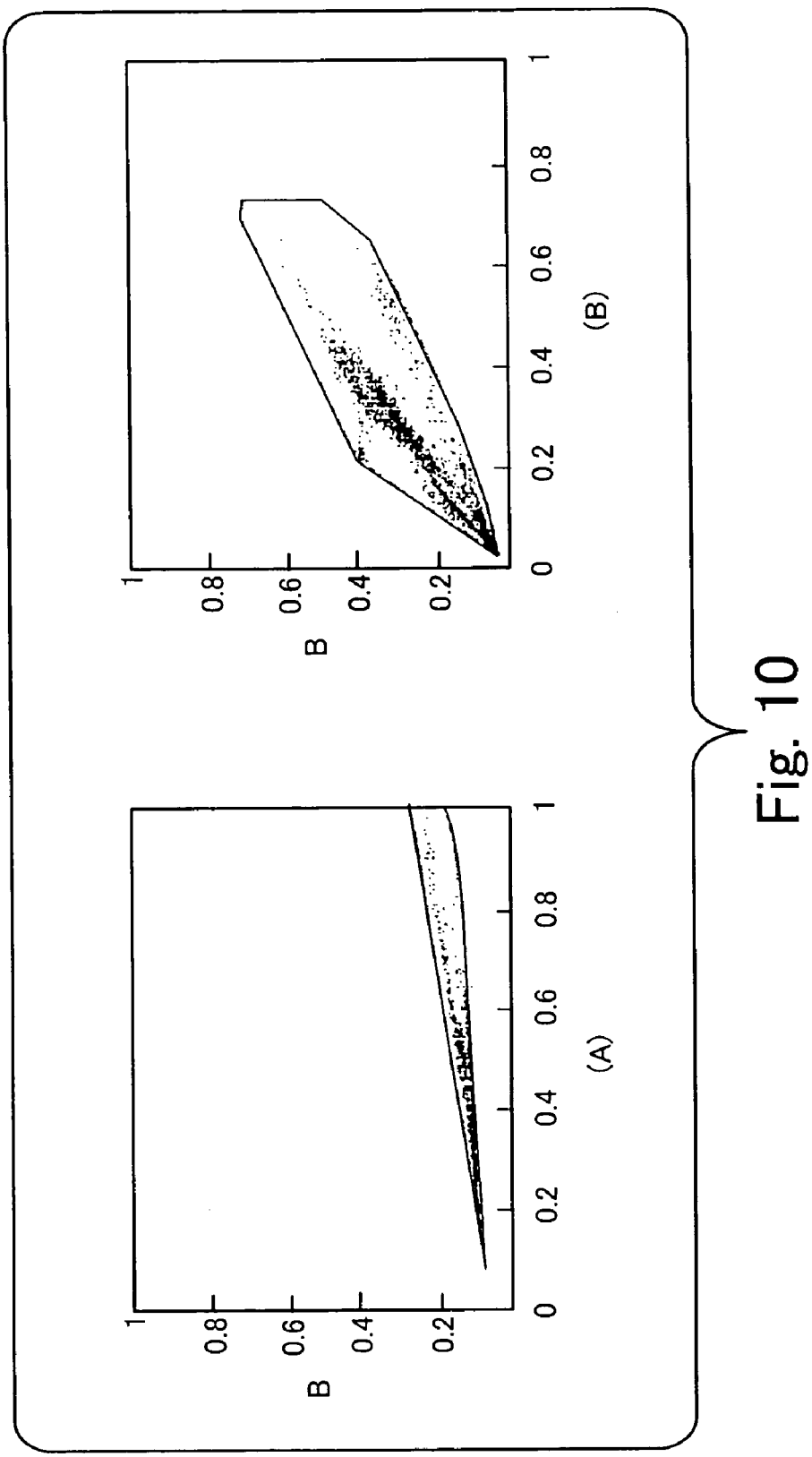
FIG. 10 shows examples of a chromaticity distribution of a photographed image.

FIG. 10 shows examples of the chromaticity distribution of the photographed image.

Part (A) of FIG. 10 shows an example of the chromaticity distribution of a photographed image taken indoors, and Part (B) of FIG. 10 shows an example of the chromaticity distribution of a photographed image taken outdoors. The gamut selecting section 193 shown in FIG. 6 analyzes the photographed image fed thereto, thereby obtaining a chromaticity distribution, such as those shown in FIG. 10. Furthermore, the gamut selecting section 193 selects a gamut best suitable for the chromaticity distribution from among the various gamuts shown in FIG. 9. In the following, a process flow of selection of the gamut will be generally described. The storage section 195 shown in FIG. 6 stores a series of data RB_gmt[x][y] ($0 \leq x \leq 100$, $0 \leq y \leq 100$), each of which concerns one of 100 by 100 regions resulting from dividing the RB plane for each gamut shown in FIG. 9 and assumes 1 when the relevant region lies in the gamut and assumes 0 when the relevant region lies out of the gamut.

First, for each of the pixels of the photographed image, the brightness value $I_i$ is calculated.

$$I_i = (R_i^2 + G_i^2 + B_i^2)^{1/2} \quad (1)$$

Then, the maximum brightness value $I_{max}$ is selected from among the calculated brightness values $I_i$, and normalization with the maximum brightness value $I_{max}$ is performed ($0 \leq k \leq 1$).

$$(R,G,B) = (kR/I_{max}, kG/I_{max}, kB/I_{max}) \quad (2)$$

Furthermore, a series of data RB_img[x][y] ($0 \leq x \leq 100$, $0 \leq y \leq 100$) are created, each of which concerns one of 100 by 100 regions resulting from dividing the normalized RB plane and assumes 1 when the relevant region has a value and assumes 0 when the relevant region has no value.

The RB_img[x][y] are compared with the RB_gmt[x][y] stored in the storage section 195, and a series of data RB_com[x][y] are created, each of which assumes 1 when RB_img[x][y]=RB_gmt[x][y]=1 and otherwise assumes 0.

Using the created data RB_com[x][y], a correlation value is calculated.

$$\text{Correlation value} = \Sigma RB\_com / (\Sigma RB\_img * \Sigma RB\_gmt)^{1/2} \quad (3)$$

The correlation value is calculated for each of the gamuts shown in FIG. 9 by changing the value of k from 1.0 to 0.1 in decrements of 0.1, and the gamut for the maximum correlation value is selected.

The photographed image that needs white balance correction and the gamut selected through the series of calculations described above are transmitted from the gamut selecting section 193 shown in FIG. 6 to the image correcting section 194.

The image correcting section 194 acquires a color temperature associated with the gamut transmitted thereto from the gamut selecting section 193 (step S5 in FIG. 7). Once the color temperature is acquired, a white balance correction adapted for the color temperature is performed on the photographed image (step S6 in FIG. 7). The processing of step S5 is an example of a correction processing step of the image processing method according to the present invention.

When selecting a gamut, information about a photographic condition, such as information about presence or absence of a flash, close-up or other zoom information, and information about a photographed site, may be additionally taken into consideration.

Besides, when gamut selection is made for plural images, different gamuts may be selected even though the images are similar to each other. Thus, plural gamuts may be selected and used to estimate the color temperature. By estimating the color temperature in this way, variations in white balance correction among images can be reduced.

In addition, preferably, plural photographed images taken in the light of a light source having a predetermined color temperature are prepared, and statistics of the chromaticity distributions thereof are previously stored. By comparing the color temperature and chromaticity distribution of the photographed image acquired through the series of processings described above with the stored statistics, the precision of the white balance correction can be further improved.

The photographed image having undergone the white balance correction is fed to the FD 165 shown in FIG. 3 or the image output machine 200 shown in FIG. 1.

In this way, for the photographed image that is determined to need white balance correction, correction for color temperature of the light source can be performed with high precision by analyzing the chromaticity distribution thereof, selecting a gamut suitable for the chromaticity distribution and then performing white balance correction adapted for the color temperature associated with the gamut. In addition, by preparing plural sets of gamuts as described above, highly precise correction taking into consideration not only the color temperature of the light source but also variations of the color distribution due to the acquisition condition of the photographed image can be performed.

In the above description, the storage section of the image processing device stores plural sets of gamuts each of which is associated with one of plural color temperatures for the light source illuminating the subject, and each set is prepared for an acquisition condition of the photographed image. However, the storage section according to the present invention may store only one set of gamuts each of which is associated with one of plural color temperatures for the light source illuminating the subject.

In addition, in the above description, the image processing device performs white balance correction on the photographed image taken with a digital camera or a film camera. However, the image processing device according to the present invention may perform white balance correction on a photographed image taken with a video camera, for example.

In addition, in the above description, a gamut close to the chromaticity distribution of the photographed image is selected from among all the gamuts stored in the storage section. However, for example, in the image processing device according to the present invention, after the analysis section analyzes the acquisition condition of the image, the color reproduction range selecting section may selects a color reproduction range close to the color distribution of the image from among a set of color reproduction ranges suitable for the analysis result.

What is claimed is:

1. An image processing device, comprising:
   an image input section that receives an image of a subject;
   a storage section that stores color reproduction ranges each corresponding to color temperature;
   an analysis section that analyzes a chromatic characteristic of the image received and determines whether the image needs white balance correction or not;
   a color reproduction range selecting section that analyzes a color distribution of the image and selects a color reproduction range close to the color distribution from among the color reproduction ranges stored in the storage section, when the analysis section determines that the image needs white balance correction; and
   a correction processing section that performs white balance correction based on the color reproduction range selected by the color reproduction range selecting section.

2. The image processing device according to claim 1, wherein the storage section stores plural sets of plural color reproduction ranges, each of the color reproduction ranges being associated with one of plural color temperatures for a light source, and each of the sets being associated with one of plural different image acquisition conditions.

3. The image processing device according to claim 1, wherein the analysis section hierarchically analyzes plural chromatic characteristics of the image received at the image input section.

4. The image processing device according to claim 1, wherein the analysis section analyzes, as the chromatic characteristic, a deviation of a gray color in an image from a target gray color previously prepared.

5. The image processing device according to claim 1, wherein the analysis section analyzes, as the chromatic characteristic, a gradient of a regression line resulting from normalization of colors of an image in an RB plane.

6. The image processing device according to claim 1, wherein the analysis section analyzes, as the chromatic characteristic, the degree of clumping of an R color in an image.

7. The image processing device according to claim 1, wherein the analysis section analyzes, as the chromatic characteristic, an aver age R value at a high-chroma point in an image.

8. The image processing device according to claim 1, wherein the analysis section analyzes, as the chromatic characteristic, the concentration of a gray color in an image.

9. The image processing device according to claim 1, wherein the analysis section analyzes, as the chromatic characteristic, which color range a color in an image lies in.

10. The image processing device according to claim 1, wherein the analysis section analyzes, as the chromatic characteristic, the number of pixels in a region close to the origin of an RB plane.

11. A computer readable recording medium storing a program capable of causing a computer to process steps comprising:
   an image input step of inputting an image of a subject;
   an analysis step of analyzing a predetermined chromatic characteristic of the image received at the image input section, thereby determining whether the image needs white balance correction or not;
   a color reproduction range selecting step of analyzing a color distribution of the image if the analysis section determines that the image needs white balance correction and selecting a color reproduction range close to the color distribution from among previously stored color reproduction ranges for images of subjects taken in the light of plural light sources each having plural color temperatures; and
   a correction processing step of performing white balance correction adapted for a color temperature associated with the color reproduction range selected by the color reproduction range selecting section.

12. The computer readable recording medium according to claim 11, wherein the color reproduction range selecting step selects a color reproduction range close to the color distribution from among plural sets of plural color reproduction ranges, each of the color reproduction ranges being associated with one of plural color temperatures for a light source, and each of the sets being associated with one of plural different image acquisition conditions.

13. The computer readable recording medium according to claim 11, wherein the analysis step hierarchically analyzes plural chromatic characteristics of the image received at the image input step.

14. An image processing method, comprising:
   an image input step of inputting an image of a subject;
   an analysis step of analyzing a predetermined chromatic characteristic of the image received at the image input section, thereby determining whether the image needs white balance correction or not;
   a color reproduction range selecting step of analyzing a color distribution of the image if the analysis section determines that the image needs white balance correction and selecting a color reproduction range close to the color distribution from among previously stored color reproduction ranges for images of subjects taken in the light of plural light sources each having plural color temperatures; and a correction processing step of performing white balance correction adapted for a color temperature associated with the color reproduction range selected by the color reproduction range selecting section.

* * * * *